United States Patent
Kelsay

(10) Patent No.: US 7,440,147 B2
(45) Date of Patent: Oct. 21, 2008

(54) OPTICAL SCANNING APPARATUS HAVING SELF-PROPELLED LIGHT BAR ASSEMBLY

(75) Inventor: Curtis Gregory Kelsay, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1317 days.

(21) Appl. No.: 10/053,989

(22) Filed: Jan. 19, 2002

(65) Prior Publication Data
US 2003/0137700 A1  Jul. 24, 2003

(51) Int. Cl.
H04N 1/04 (2006.01)
(52) U.S. Cl. .................. 358/474; 358/497; 358/496; 358/475; 359/557; 271/177
(58) Field of Classification Search .............. 358/474, 358/497, 475, 471, 498, 509, 496; 250/235, 250/208.1, 492.2; 359/557; 355/99, 101; 399/211, 101
See application file for complete search history.

(56) References Cited

U.S. PATENT DOCUMENTS

| | | | | |
|---|---|---|---|---|
| 4,525,749 A * | 6/1985 | Maeda et al. | ................ | 358/489 |
| 4,870,459 A * | 9/1989 | Ito et al. | ................ | 399/10 |
| 4,908,717 A * | 3/1990 | Natori | ................ | 358/474 |
| 5,036,266 A * | 7/1991 | Burke | ................ | 318/646 |
| 5,296,944 A * | 3/1994 | Suzuki et al. | ................ | 358/475 |
| 5,873,308 A * | 2/1999 | Taira | ................ | 101/327 |
| 5,920,408 A * | 7/1999 | Nagano | ................ | 358/509 |
| 5,982,948 A * | 11/1999 | Shimada et al. | ................ | 382/274 |
| 6,381,041 B1 * | 4/2002 | Hayashi et al. | ................ | 358/474 |
| 6,392,377 B1 * | 5/2002 | Yamauchi | ................ | 318/630 |
| 6,489,602 B1 * | 12/2002 | Wang et al. | ................ | 250/208.1 |
| 6,553,154 B1 * | 4/2003 | Cheng | ................ | 382/312 |
| 6,703,604 B2 * | 3/2004 | Tseng et al. | ................ | 250/235 |
| 6,717,702 B1 * | 4/2004 | Yamauchi et al. | ................ | 358/497 |
| 6,753,534 B2 * | 6/2004 | Novak et al. | ................ | 250/442.11 |
| 6,771,401 B2 * | 8/2004 | Chen | ................ | 358/512 |
| 6,961,154 B2 * | 11/2005 | Sugano | ................ | 358/475 |
| 2001/0010582 A1 * | 8/2001 | Hayashi et al. | ................ | 358/474 |
| 2002/0080427 A1 * | 6/2002 | Clifton | ................ | 358/505 |

\* cited by examiner

Primary Examiner—Edward L. Coles
Assistant Examiner—Negussie Worku

(57) ABSTRACT

The present invention provides for an optical scanning apparatus having a scanner body and a self-propelled light bar assembly supported within the scanner body. In one example the scanning apparatus further includes a drive track supported within the scanner body, and the light bar assembly includes a drive wheel in contact with the drive track. This configuration allows the drive wheel to propel the light bar assembly with respect to the scanner body. In a second example the scanner has a scanner body and a magnet-track portion of a linear electric motor fixedly supported within the scanner body. The light bar assembly includes a slider portion of a linear electric motor, and the light bar assembly is supported in the scanner body to place the magnet-track portion in proximity to the slider portion to thereby allow the light bar assembly to be driven along the magnet-track portion.

14 Claims, 9 Drawing Sheets

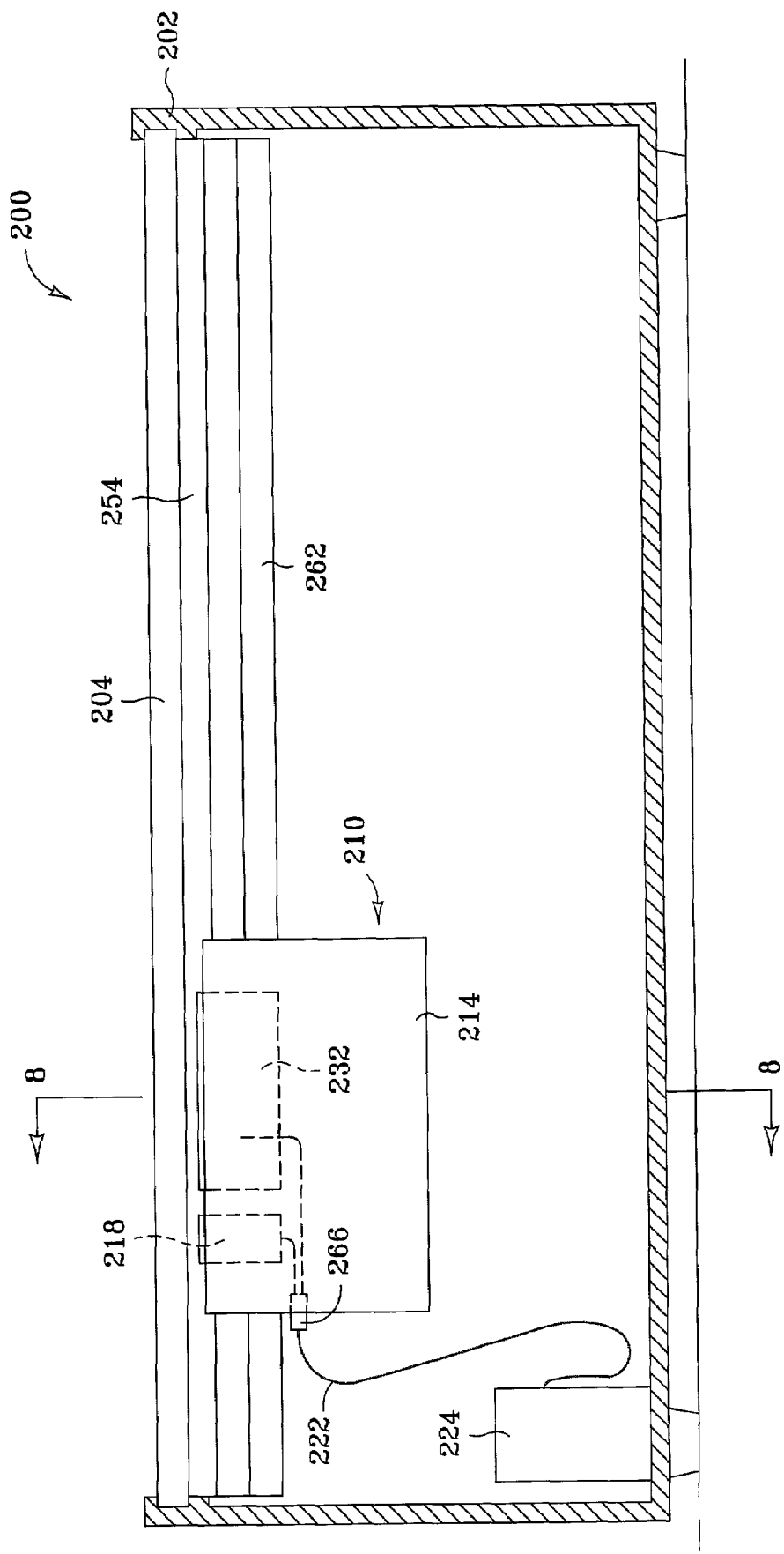

OPTICAL SCANNING APPARATUS HAVING SELF-PROPELLED LIGHT BAR ASSEMBLY

FIELD OF THE INVENTION

The invention claimed and disclosed herein pertains to methods and apparatus for optically scanning an object, such as a document.

BACKGROUND OF THE INVENTION

The present invention pertains to methods and apparatus for optically scanning an object, such as a document, and particularly to an optical scanning apparatus, and an optical scanning method, which improve on prior art methods and apparatus for optically scanning an object. More specifically, the present invention is applicable to a document scanning apparatus, which is an apparatus configured to optically scan a document to thereby obtain a digital representation of the scanned document so that the digital representation of the document can be later used for various purposes. For example, the document scanning apparatus can be a flat-bed scanner which allows a user to capture a digital image of a document (or other object) placed on a scanning surface. The captured image can then be manipulated by a computer. For example, the scanned image can be cropped, rotated, or digital character recognition can be performed on text portions of the scanned image. Another example of an optical scanning apparatus which the present invention can be applied to is the document scanning section of a photocopier or a facsimile machine, or a combination printer-copier (or other so-called "all-in-one" document processing apparatus).

A document scanning apparatus generally includes a light bar assembly which includes a light source. Light from the light source reflects off of reflective portions of an object (such as a document) which is optically scanned by the light source. The light that is reflected from the object is recorded by sensors (which are typically located in the light bar assembly). Signals generated by the sensors in response to detecting the reflected light are then used by a processor to create an electronic image (typically in the form of a digital file) that is representative of the object being scanned. When the optical scanning apparatus comprises part of a document imaging apparatus which includes a sheet feeder for feeding one or more sheets of an original document to be scanned, then the light bar assembly can remain stationary as documents are moved past the light bar assembly by the sheet feeder. However, not all devices which use optical scanners have sheet feeders, and furthermore, there are instances where a sheet feeder is not helpful. For example, if a user wishes to scan one page of a book without removing the page from the book, then a sheet feeder is of no help (since the book cannot be fed through the sheet feeder). Accordingly, many optical scanning apparatus are provided with a drive system which is used to move the light bar assembly relative to the object to be scanned. Thus, an object can be placed on a scanning surface (for example, a glass surface, or a "platen"), and the light bar assembly can then be moved past the object using the drive system.

Turning to FIG. 1, a prior art optical scanning apparatus 10 is depicted in a plan view. The prior art scanning apparatus 10 includes a scanner body or chassis 12 which supports the other components of the scanner 10. Supported within the top of the scanner 10 is a platen (not shown to facilitate visualization of the other components), and mounted beneath the platen is a light bar assembly 14. A cover (not shown) is typically provided, which is used to cover the platen during a scanning process. The light bar assembly 14 is supported on two parallel guide rods 18, and is configured to move along rods 18 in directions "A" and "A'" to thereby move past a document (or other object) placed on the platen. Guide rods 18 must be accurately positioned relative to one another, and the platen, in order to allow the light bar assembly 14 to move beneath the platen in close proximity to the platen. At the same time, the light bar assembly 14 must form a close tolerance fit with the rods 18 so that excessive movement of the light bar assembly 14 (in directions other than the intended direction of travel) does not occur. Undesirable movement of the light bar assembly 14 while scanning a document can result in an inaccurate scanned image.

The light bar assembly 14 includes a light source 16, as well as other components (not shown), such as reflected light detecting sensors and electronic components for controlling activation of the light source and data routing of signals from the light detecting sensors. A flexible cable strip 38 is connected to the light bar assembly 14 and routes electrical power and activation signals to the light bar assembly. The flexible cable strip 38 is also used to route data signals from the light detecting sensors away from the light bar assembly 14 to a processor (not shown) so that the signals can be processed to generate an image of a scanned document or object.

The light bar assembly 14 is moved in directions "A" and "A'" by a drive system which includes the following components. Mounted on the chassis 12 is a spindle shaft 26. Spindle shaft 26 includes a first spindle barrel 28 and a second spindle barrel 30. The spindle shaft 26 includes a drive wheel 27. A motor 44 drives the spindle shaft 26 via a belt 46 which passes around the drive wheel 27. Mounted on a first side of the light bar assembly 14 is a two-wheel pulley 40, and mounted on a second side of the assembly 14 is a single wheel pulley 42. A pair of primary drive cables 20 are fastened to the first spindle barrel 28 at a first end of each primary drive cable (only one free end 23 of which can be seen in the view depicted). A first one of the primary drive cables 20 passes around the two-wheel pulley 40, and a second end 22 of this primary drive cable is then fastened to an anchor 24 which is attached to the chassis 12. The second primary drive cable 20 passes around a third pulley 44 (which is supported by the scanner body 12), and is then anchored at the second wheel of pulley 40. In this way, by driving the spindle shaft 26 in a first direction, the first of the two primary drive cables 20 is wound onto the first spindle barrel 28, thereby drawing the light bar assembly 14 in direction "A". As the light bar assembly moves in direction "A", the light source 16 can be used to optically scan a document) or other object) placed on a platen (not shown) set in the top of the chassis 12. By reversing the drive direction of motor 44, the second primary drive cable 20 can be wound onto the first spindle barrel 28, drawing the light bar assembly 14 back in direction "A'". In this way, the light bar assembly 14 can be reset to the position depicted in FIG. 1 after a document (or other object) has been optically scanned. However, since stretching of the primary drive cables 20 (which can occur over time) can create a deadband space at the beginning of scanning, the drive cables 20 are typically manufactured from multiple strands of steel wire which are wrapped together to produce a single cable that is resistant to stretching.

The light bar assembly drive system can further include a second drive cable 32 which is anchored to the second spindle barrel 30 at a first end. The second drive cable 32 passes around the one-wheel pulley 42, and is anchored at a second end 34 of the cable to a second anchor 36. The second drive cable 32 can be used to facilitate movement of the light bar assembly 14 in direction "A". In this way, more precise control of the movement of the light bar assembly 14 in direction "A" can be obtained. Precise control of the positioning of the light bar assembly 14 while optically scanning a document (or other object) is desirable since the data capture of the light reflections from the document or object being scanned needs to be precisely associated with position information. In this way an accurate image of the item being scanned can be generated.

The light bar assembly drive mechanism can, and typically does, also include a tensioning system to maintain tension on the drive belt 46 which connects the motor shaft 50 to the spindle shaft dive wheel 27. As depicted in FIG. 1, the tensioning system includes a spring 48 which is anchored to the chassis 12 at a first end, and is attached to a rigid arm 53 at a second end. The rigid arm 53 supports the drive shaft 50 of the motor 44. The motor 44 is mounted to a plate 51 which is in turn slidably supported by the chassis 12. Accordingly, as the length of the drive belt 46 changes (due to changes in temperature, or wear of the belt), the tensioning system maintains a constant force on the drive wheel 27. The tensioning system is an important component of prior art scanners since any slippage of the belt 46 on the drive wheel 27 will result in the light bar assembly 14 being moved in direction "A" at a speed which is different than the design speed. Since the rate of data collection is dependent on the velocity of the light bar assembly 14 as it moves in direction "A" to scan a document, a variance in speed of the light bar assembly 14 can affect the resultant scanned image.

As can be seen, the prior art light bar assembly drive system is quite complicated and includes a large number parts, many of which are moving parts, and many of which are precision parts and/or are prone to wear or deformation (typically stretching) over time. Consequently, prior art optical scanning apparatus are expensive to manufacture, prone to mechanical failure, difficult to repair, and susceptible of generating inaccurate scanned images when the drive system components get out of tolerance or out of alignment. Further, a large number of moving parts generally results in a fair amount of operating noise.

An additional problem with the prior art scanning apparatus depicted in FIG. 1 relates to the guide rods 18. As mentioned previously, the guide rods must form a precision fit with the light bar assembly 14, and therefore the rods 18 are typically precision machined from metal rods. While metal may be a desirable material of construction from the standpoint of providing a precision fit and resistance to wear, metal is particularly susceptible to thermal expansion. Thus, as the temperature within the scanning apparatus changes (which often is the result of use of the apparatus), the rods 18 will lengthen or shorten beyond an ideal design length. Ambient temperatures can also affect the length of the guide rods. This change in length of the guide rods can in turn affect the tension on the drive cables 20 and 32, as well as the length of the scanning path, all of which can affect the accuracy of the final scanned image.

FIG. 1 depicts only one embodiment of a prior art scanning apparatus. Other less complex light bar assembly drive systems are sometimes used. For example, the drive cable configuration (cables 20 and 32) can be replaced with one or two driven belts. However, as such belts are prone to elongation (stretching) over a period of time as a result of use and general aging, a belt tensioner (similar to the tensioning system depicted in FIG. 1) must be employed if any reasonable accuracy is to be maintained in the system. Further, unless the belt is manufactured from a particularly robust material, over time the belt can wear and eventually fail. As indicated, some of the detriments of using a belt to drive the light bar assembly can be reduced if a sufficiently robust belt is used. However, this can affect the overall size of the scanning apparatus. That is, a large scanner chassis may be required to provide additional space within the scanner to accommodate the oversized belt, while ensuring that the belt does not interfere with the optical scanning of a document. Typically, consumers do not want office equipment that is unduly large, and so increasing the size of the chassis to accommodate additional, or more robust, components is generally undesirable.

What is needed then is an optical scanning apparatus which achieves the benefits to be derived from similar prior art devices, but which avoids the shortcomings and detriments individually associated therewith.

SUMMARY OF THE INVENTION

A first embodiment of the present invention provides for an optical scanning apparatus having a scanner body and a self-propelled light bar assembly supported within the scanner body. In one example the optical scanning apparatus can further include a platen supported by the scanner body, and the self-propelled light bar assembly can include a drive wheel in contact with a drive track or drive surface defined on the platen. This allows the drive wheel to drive the light bar assembly along the platen. In a second example, the optical scanning apparatus can further include a drive track supported within the scanner body, and the self-propelled light bar assembly can have a drive wheel in contact with the drive track. This also allows the drive wheel to propel the light bar assembly with respect to the scanner body.

A second embodiment of the present invention includes an optical scanning apparatus having a scanner body. A magnet-track of a linear electric motor is fixedly supported within the scanner body. The scanner further includes a light bar assembly having a slider of a linear electric motor, the slider being fixedly supported by the light bar assembly. The light bar assembly is supported in the scanner body so as to place the slider in proximity to the magnet-track, and thereby allow the light bar assembly to be driven (by the slider) along the magnet-track.

A third embodiment of the present invention provides for a method of moving a light bar assembly within a scanner body of an optical scanning apparatus. The method includes providing a stationary track within the scanner body, and providing a motive source supported by the light bar assembly. The method then includes moving the light bar assembly along the stationary track using the motive source. Non-limiting examples of the motive source include a rotary electric motor and a linear electric motor.

These and other aspects and embodiments of the present invention will now be described in detail with reference to the accompanying drawings, wherein:

DESCRIPTION OF THE DRAWINGS

FIG. 7 is a side elevation sectional view depicting a scanning apparatus in accordance with a third embodiment of the present invention.

DETAILED DESCRIPTION OF THE INVENTION

The present invention provides methods and apparatus which address the above-described problems with prior art optical scanning apparatus. More specifically, the present invention provides for a self-propelled light bar assembly within an optical scanning apparatus. By "optical scanning apparatus" I mean any apparatus configured to move a light bar relative to a stationary object to thereby optically scan the object. Examples of optical scanning apparatus include flatbed document scanners, the optical scanning section in a photocopier (or an all-in-one document processing apparatus), and certain facsimile machines. Examples of light sources that can be used in the light bar include a single, monolithic source of light (such as a halogen light bulb), a series of light emitting diodes, and a swept laser. However, the choice of the light source used in the light bar is not relevant to the present invention. Examples of objects than can be optically scanned by optical scanning apparatus (i.e., "scannable objects") include documents, pages of books, photographs, and other two-dimensional objects. Scannable objects can also include three dimensional objects, in which case the optical scanning apparatus can scan one side of the three dimensional object that is held in proximity to the path of the light bar.

Most optical scanning apparatus which use a traveling (i.e., moving) light bar to scan a scannable object include a platen which is used to support the scannable object as the object is scanned. The platen can be, for example, a glass plate (or a sheet of other transparent material) set in the upper portion of the scanner apparatus. The light bar is then positioned beneath the platen, and is configured to move along the underside of the platen to thereby scan an object which h as been placed on top of the platen. In the examples which will be described below, the optical scanning apparatus of the present invention are depicted as including a platen, although this is not a requirement for optical scanning apparatus in accordance with the present invention.

Figure 1:
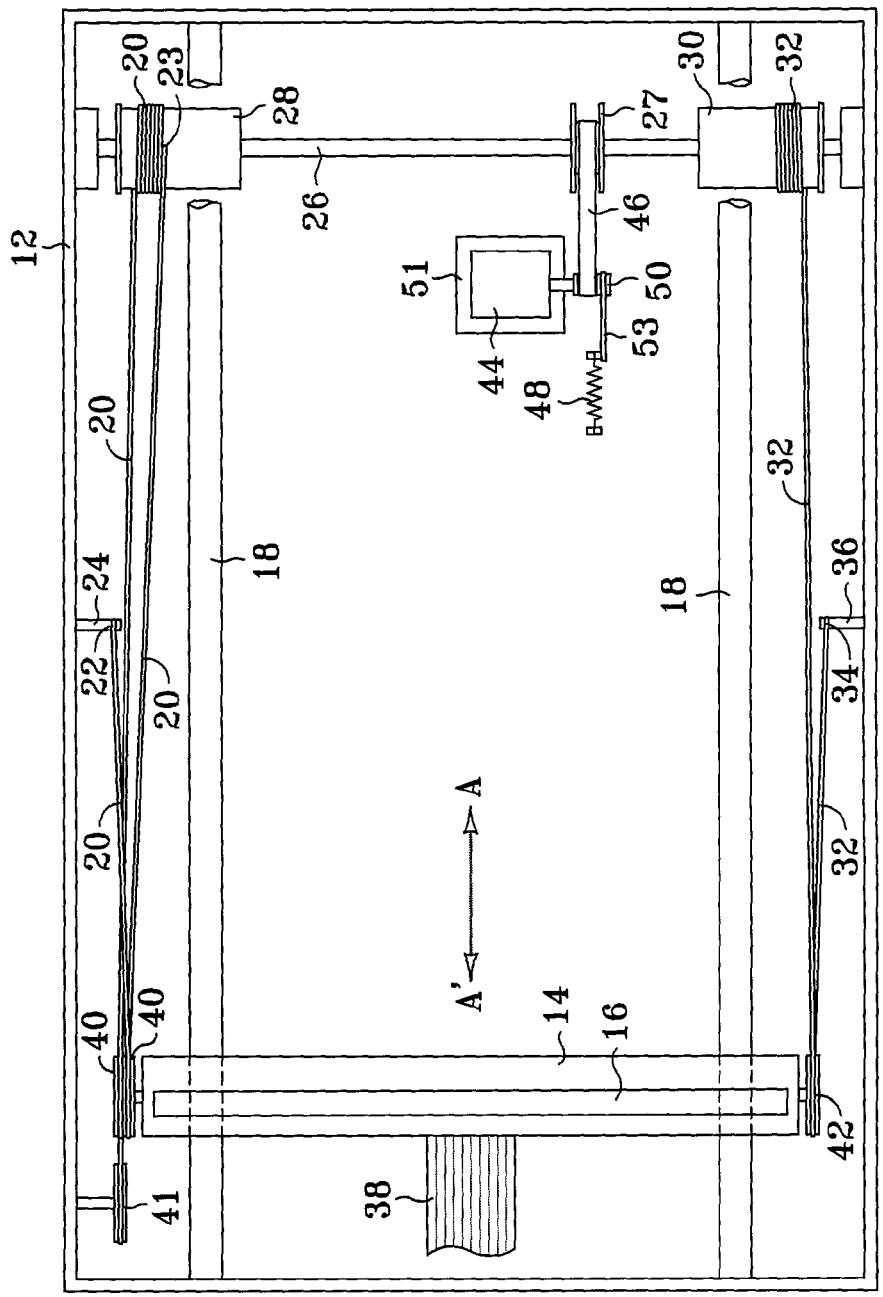
FIG. 1 is a plan view depicting a scanning apparatus of the prior art.

The present invention provides for an optical scanning apparatus having a self-propelled light bar assembly, as will be more full described below. By "self propelled" I mean that the light bar assembly contains the drive source (i.e., the motive source which drives the light bar assembly relative to the scanner body). This is to be distinguished from the prior art scanner apparatus, wherein the motive source for the light bar is not supported by, or contained within, the light bar and it's immediately supporting structure. (See for example, FIG. 1, described above.) While examples of the present invention depict electricity as the power source for moving the light bar assembly within the scanner body, the invention should not be considered as limited to the use of electricity as the power source. Other power sources, such as pneumatic and hydraulic power, can also be employed.

I will now describe examples of my invention with respect to the attached drawings. It will be understood that, in the interest of making the drawings more easily understood, the drawings are not to scale, and that not all components present in a scanning apparatus are depicted in the drawings.

Figure 2:
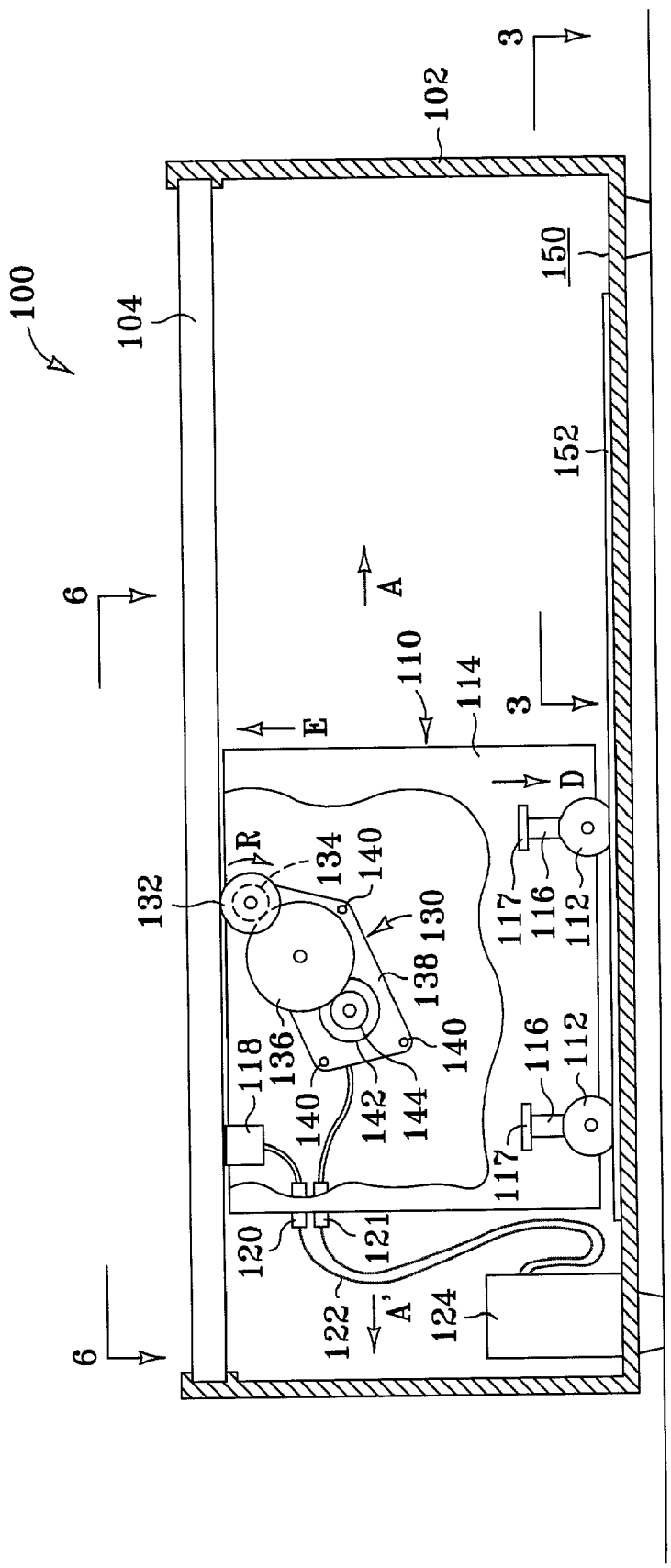
FIG. 2 is a side elevation sectional view depicting a scanning apparatus in accordance with a first embodiment of the present invention.

Turning now to FIG. 2, an optical scanning apparatus 100 in accordance with a first embodiment of the present invention is depicted in a side elevation sectional view. The scanning apparatus 100 includes a scanner body 102 which, although depicted as being a single component, can be built-up from a number of different components. The scanner body 102 can be fabricated from metal, plastic, and other materials typically used in such apparatus. The scanner body 102 is understood to include an interior chassis or frame, as well as any outer skin or covering which forms part of the scanning apparatus 100. The scanner body 102 variably houses and supports the other components of the scanner apparatus 100. As depicted, the scanner 100 includes a platen 104 which is set within the upper portion of the scanner body 102. A platen cover (not shown) can be provided which can be used to cover the platen 104 during a scanning process. The scanner 100 further includes a self-propelled light bar assembly 110. The light bar assembly 110 is configured to move in directions "A" and "A'" to scan an object (not shown) which can be placed on the top of the platen 104. The light bar assembly 110 is depicted as having an outer covering 114, although this is not necessary. The light bar assembly 110 includes a light source module 118 which includes a light source (not shown) that is used to illuminate a scannable object. The light source module 118 can also include light detecting sensors (not shown) that detect light reflected from the scannable object during the scanning process. The light source module 118 is in power and signal communication with a stationary processor and power source 124 via connector 120 and flexible cable 122. The flexible cable 122 allows the light bar assembly 110 (and the light source module 118) to move in direction "A", while remaining in signal and power communication with the stationary processor/power source 124.

The light bar assembly 110 includes a motive source, which is depicted here as a rotary electrical motor 142, visible through the cut-away section of covering 114. Motor 142 is supported within the light bar assembly 110 by motor frame 138 and fasteners 140. The motor 142 can be electrically powered via the power supply 124 and an electrical cable at connector 121. Preferably, the power cable will also be connected at connector 120, and the separate connector 121 will not be provided. The light bar assembly 110 further includes a drive wheel 132 which is used to drive the light bar assembly 110 within the scanner body 102, as will be explained further below. Drive wheel 132 is driven by motor 142 through a series of reduction wheels 144, 136 and 134. The reduction wheels are preferably geared wheels or otherwise configured (e.g., rubberized) to provide a positive engagement between one wheel and the next. It is understood that reduction wheel 134 is fixed with respect to drive wheel 132. Drive wheel 132 is in contact with a drive surface (described more fully below) which is defined within the scanner body. By contacting the drive surface, the drive wheel 132 is able to drive the light bar assembly 110 relative to the scanner body 102, and thus move the light source module 118 along the underside of the platen 104, thereby allowing the light source module to optically scan an object placed on the platen 104. For example, when drive wheel 132 rotates in direction "R", the light bar assembly 110 will be driven in direction "A" along the platen 104. By reversing the direction of rotation of the rotary motor 142, the drive wheel 132 rotates in the opposite direction, propelling the light bar assembly 110 in direction "A'".

Figure 4:
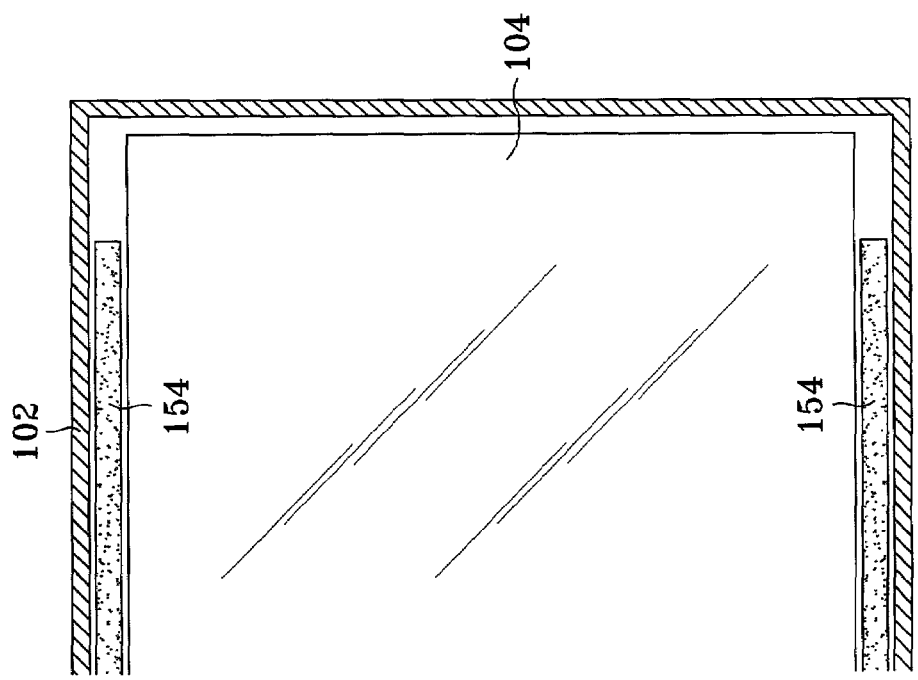
FIG. 4 is a partial bottom, sectional view of the platen of the scanning apparatus depicted in FIG. 2.

In one example, the drive surface can merely be a portion defined along one edge of the underside of the platen 104. The drive surface can also be a portion defined along the scanner body 102 adjacent to an edge of the platen 104. In a preferred embodiment, the drive surface comprises a stationary drive track supported within the scanner body. For example, turning to FIG. 4, a bottom view of a portion 103 of the scanner 100 of FIG. 2 is depicted, showing the inside, upper surface of the scanner body, as well as the lower surface of the platen 104. The platen 104 is supported by the body 102. Two drive tracks 154 are affixed to or supported by (or alternately, defined by) the body 102. In this case the light bar assembly can include two drive wheels (see for example FIG. 6, which is a top view of the light bar assembly 110 of FIG. 2), such that each drive track 154 (FIG. 4) is contacted by a drive wheel (132, FIG. 6). As indicated in FIG. 4, the drive tracks 154 can be textured to provide a non-smooth surface to thereby increase the coefficient of friction (static and rolling) between the drive wheel and the scanner body. This will allow the drive wheels (132, FIG. 6) to more positively engage the drive tracks 154 (FIG. 4). The drive wheels 132 (FIGS. 2 and 6) can include a rubberized outer portion (or they can be fabricated entirely from a rubberized material) to more affirmatively engage the drive tracks 154 (FIG. 4). Accordingly, the configuration of using a drive wheel (such as 132, FIG. 2) as just described to engage a portion of the scanner body, or the platen, of a surface connected to either of them, to thereby drive the light bar assembly with respect to the scanner body can be considered as a friction drive system for the light bar assembly.

Figure 5:
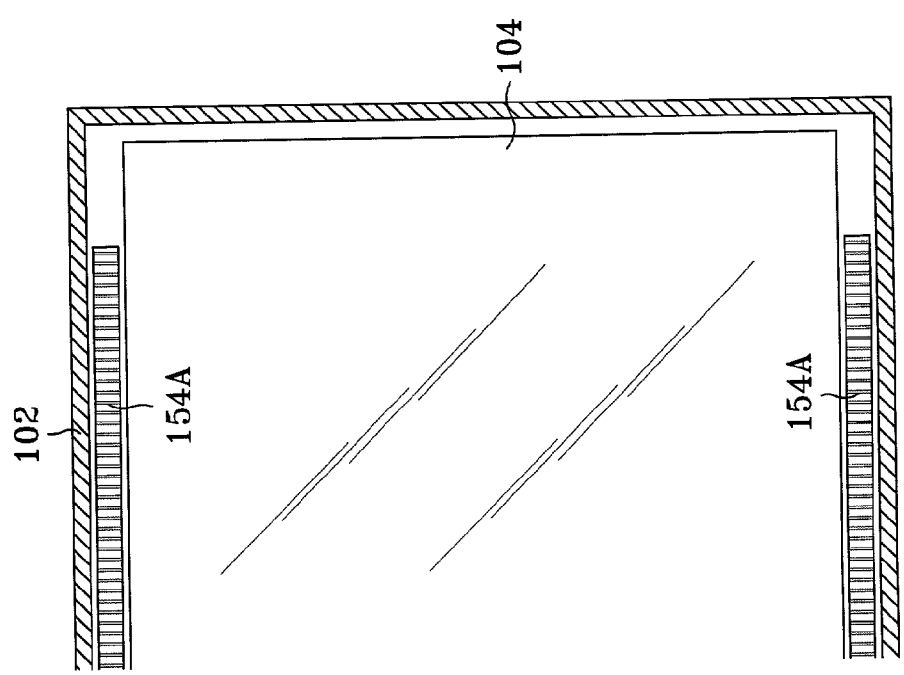
FIG. 5 is an alternate partial bottom, sectional view of the platen of the scanning apparatus depicted in FIG. 2.

Turning to FIG. 5, a variation on the configuration depicted in FIG. 4 is shown. FIG. 5 depicts a bottom view of a portion 103A of the scanner 100 of FIG. 2, showing the inside, upper surface of the scanner body 102, and the underside of the platen 104. The platen 104 is supported by the body 102. Two drive tracks 154A are affixed to or supported by (or alternately, defined by) the body 102. As indicated, the drive tracks 154A are geared with gear teeth. In this case, the drive wheel 132 (FIG. 2) can have a geared outer periphery such that the gears defined on the drive wheel 132 will meshingly engage with the gear teeth on the gear tracks 154A (FIG. 5). Both the drive wheel 132 (FIG. 2), and the gear tracks 154A (FIG. 5) can be fabricated from nylon or other synthetic material. Alternately, these components can be fabricated from metal to provide better wear resistance.

Returning to FIG. 2, the light bar assembly 110 can further include support wheels 112 which support the light bar assembly 110 on a support surface within the scanner body 102. As depicted in FIG. 2, the support surface can comprise the inside lower surface 150 of the scanner body 102. However, the support surface can also be a support track which is positioned within the scanner body 102 somewhere between the underside of the platen 104 and the inside lower surface 150 of the scanner body. As shown, support wheels 112 are supported on the light bar assembly 110 by biasing members 116, which are fixed to the cover 114 of the light bar assembly 110 by mounting brackets 117. The biasing members 116 can be, for example springs or any compliant member configured to exert a force when compressed, as well as an electrically powered force exerting member. The biasing members 116 are positioned and configured to urge the drive wheels 112 in direction "D" against the support surface 150. In this way, a reactive force in direction "E" urges the drive wheel 132 against the drive surface (e.g., 154, FIG. 4, or 154A, FIG. 5). The biasing members 116 thus help to ensure a positive engagement between the drive wheel 132 and the drive surface so that minimal slippage of the drive wheel occurs. That is, the biasing members increase the normal force between the drive wheels 132 and the drive track, thereby increasing the coefficient of static and rolling friction between the components and providing a more positive engagement of the drive wheel to the drive track.

Figure 3:
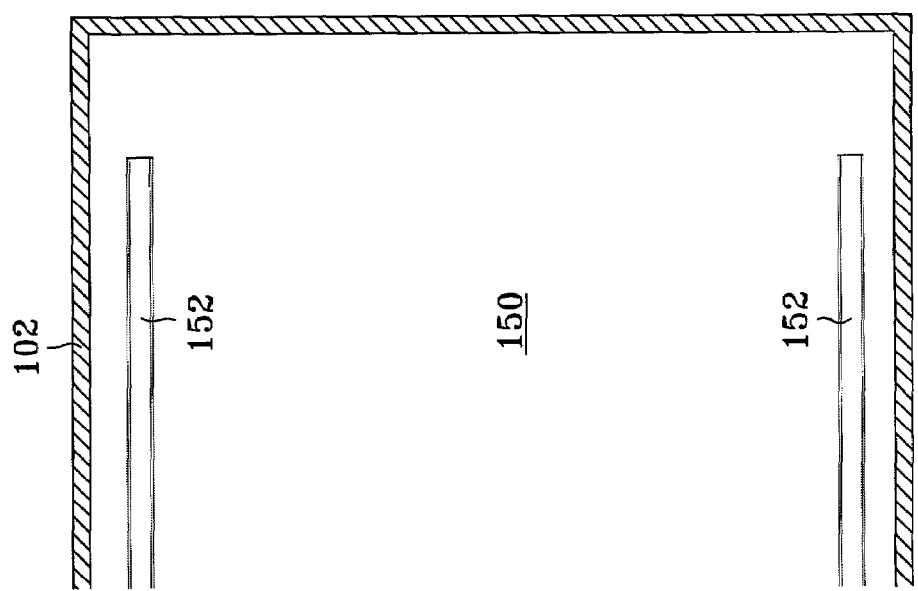
FIG. 3 is a partial plan, sectional view of the bottom of the scanning apparatus depicted in FIG. 2.

Turning to FIG. 3, a partial, plan sectional view of a variation of portion of the scanner 100 of FIG. 2 is shown. The view depicted in FIG. 3 shows the bottom, inner surface 150 of the scanner body 102. However, as depicted in FIG. 3, the bottom surface 150 have two parallel grooves or slots 152 formed therein. The slots 152 can be spaced to receive the support wheels 112 depicted in FIG. 2. In this way the light bar assembly 110 of FIG. 2 can be guided along the drive surface (e.g., drive tracks 154, FIG. 4, or 154A, FIG. 5) in an aligned manner. Alternate, or additional, alignment devices beyond slots 152 can be used to enhance alignment of the light bar assembly 110 for movement in directions "A" and "A'" (FIG. 2).

Figure 6:
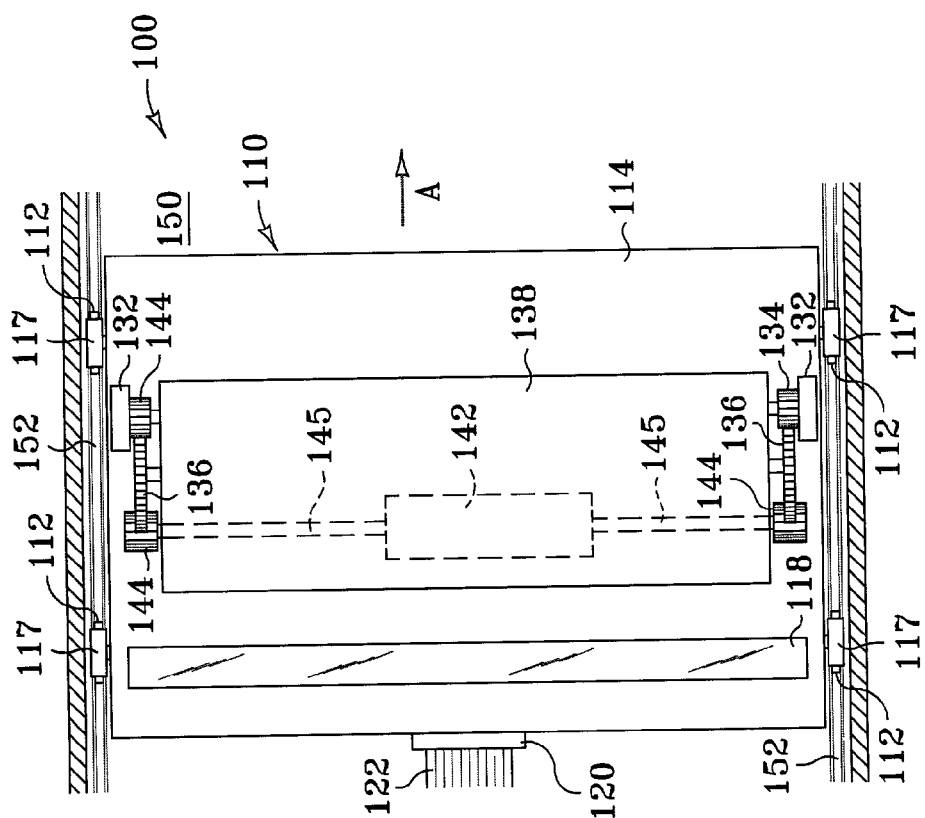
FIG. 6 is a partial plan view depicting the light bar assembly used in the scanning apparatus of FIG. 2.

Turning to FIG. 6, a partial, plan sectional view of the scanner apparatus 100 of FIG. 2 is depicted. As can be seen, the light bar assembly 110 can include two drive wheels 132, i.e., a first drive wheel 132 supported on the assembly 110 proximate a first side (left side) of the assembly 110, and a second drive wheel (also 132) supported on the assembly 110 proximate a second side (right side) of the assembly 110. The first and second drive wheels 132 thus contact respective first and second drive surfaces (such as the two drive tracks 154 of FIG. 4, or 154A of FIG. 5). This arrangement (i.e., using two drive wheels) can help to further align the light bar assembly 110 as it moves in direction "A". The alignment slots 152 (also depicted in FIG. 3) can be seen as receiving the support wheels 112. In the variation depicted in FIG. 6, the drive motor 142 drives a single drive shaft 145, which is coupled to geared reduction wheels 144, 136 and 134. As described previously, reduction wheels 134 are directly coupled to drive wheels 132, thus allowing the rotary motor 142 to drive the drive wheels 132.

In order to accurately determine the position the light bar assembly (110 of FIG. 2) assembly with respect to the platen 104, the rotary electric motor 142 can be a stepper motor, and preferably an open loop stepper motor under drive control (as through a processor, not shown). In this way, each controlled rotary "step" of the motor will correspond to a fixed incremental distance of movement of the light bar assembly. In another variation, the motor 142 can be provided with a rotary encoder, in which case the motor 142 is preferably a DC brush motor. The rotary encoder detects the amount of rotation, and number of rotations, of the rotor in the motor 142. This information can be used (by a processor, for example) to determine the distance the light bar assembly 110 has moved with respect to the platen 104.

Figure 10:
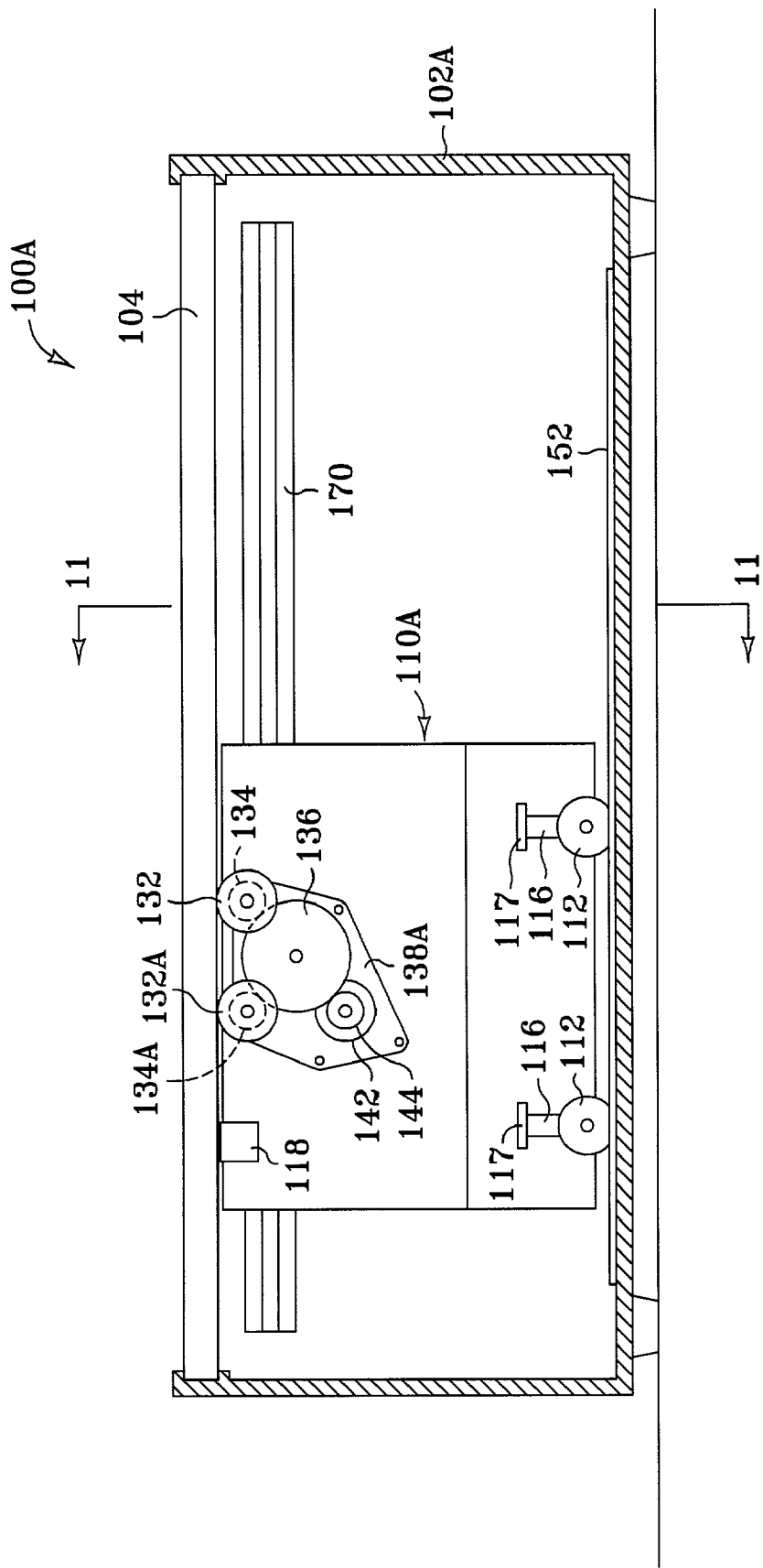
FIG. 10 is a side elevation sectional view depicting a variation on the scanning apparatus depicted in FIG. 2

Yet another variation on the embodiment of the scanner apparatus of FIGS. 2 and 6 is depicted in FIG. 10. The scanning apparatus 100A of FIG. 10 includes like-numbered components as those in FIG. 2, including the platen 104. Further, the self-propelled light bar assembly 110A of FIG. 10 includes like-numbered components as those of the light bar assembly 110 of FIG. 2, including the motor 142 (supported by motor frame 138A), reduction wheels 144, 136 and 134, support wheels 112, and biasing devices 116. However, the light bar assembly 110A further includes a second drive wheel 132A which is located on the same side of the light bar assembly 110A as is the first drive wheel 132. The second drive wheel 132A is driven by reduction wheels 134A and 136, and is biased against the drive track (not shown) by the biasing members 116. The use of two drive wheels 132 and 132A on one side of the light bar assembly can reduce the risk that movement of the light bar assembly will be interrupted due to slippage of the drive wheel on the drive track.

Figure 11:
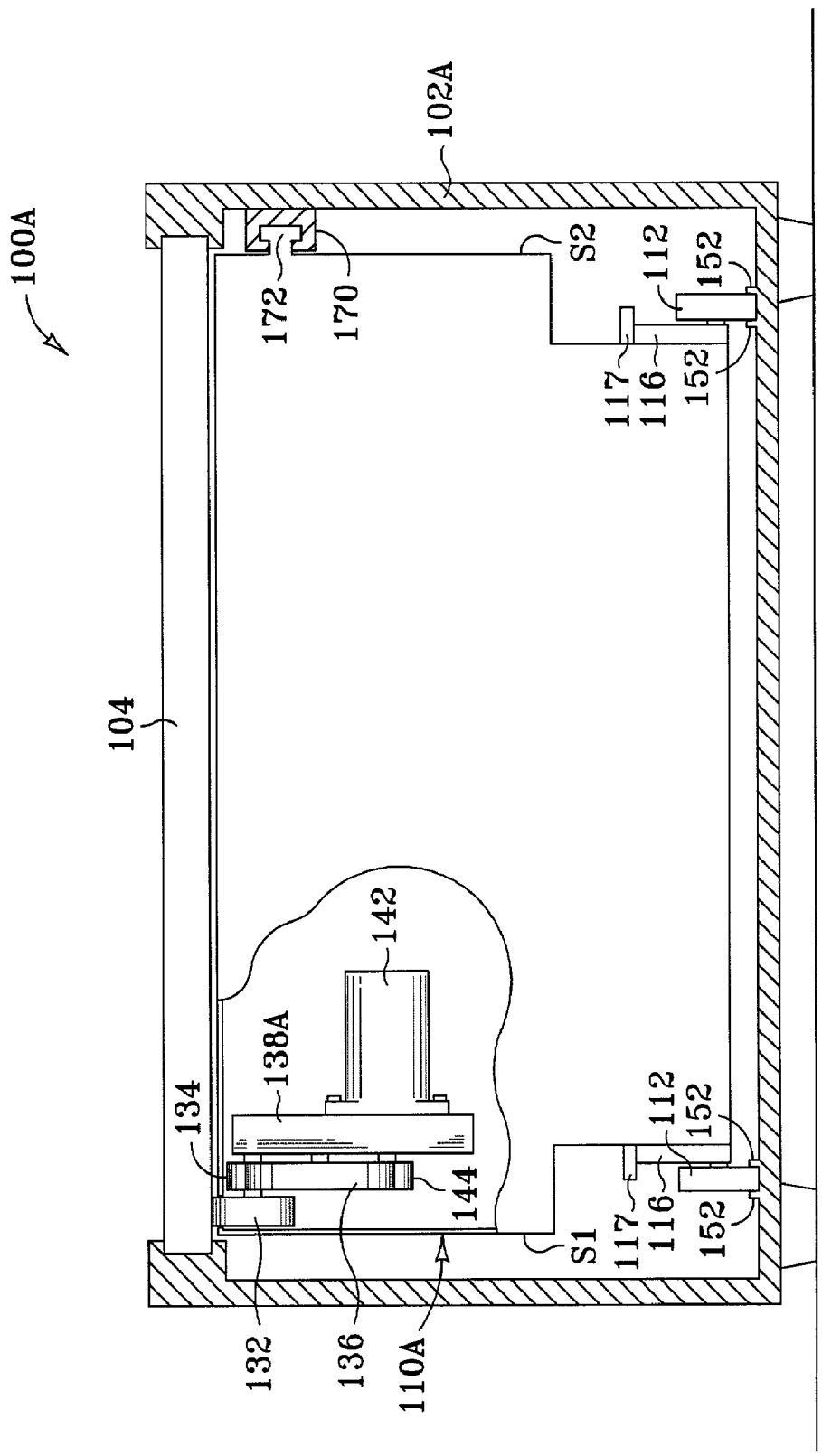
FIG. 11 is a front elevation sectional view of the scanning apparatus depicted in FIG. 10.

Turning to FIG. 11, a front elevation sectional view of the scanning apparatus 100A of FIG. 10 is depicted. As can be seen, the light bar assembly 110A can be guided along the body 102A by guide tracks 152 and support wheels 112, in the manner described above. Since both drive wheels 132 and 132A (of which only 132 is visible in FIG. 11) are located on the first side S1 (or first end) of the light bar assembly 110A, to help maintain alignment of the light bar assembly 110A with respect to the scanner body 102A as the light bar assembly is propelled along by the drive wheels, a guide device can be provided at the second side S2 (or second end) of the light bar assembly 110A. As depicted the guide device is comprised of a channel section 170 which is supported by the scanner body 102A. A guide member 172, which is supported on the light bar assembly 110A, fits within the channel section 170 to thereby constrain movement of the light bar assembly to the direction along the length of the channel 170 (as seen in FIG. 10).

Figure 9:
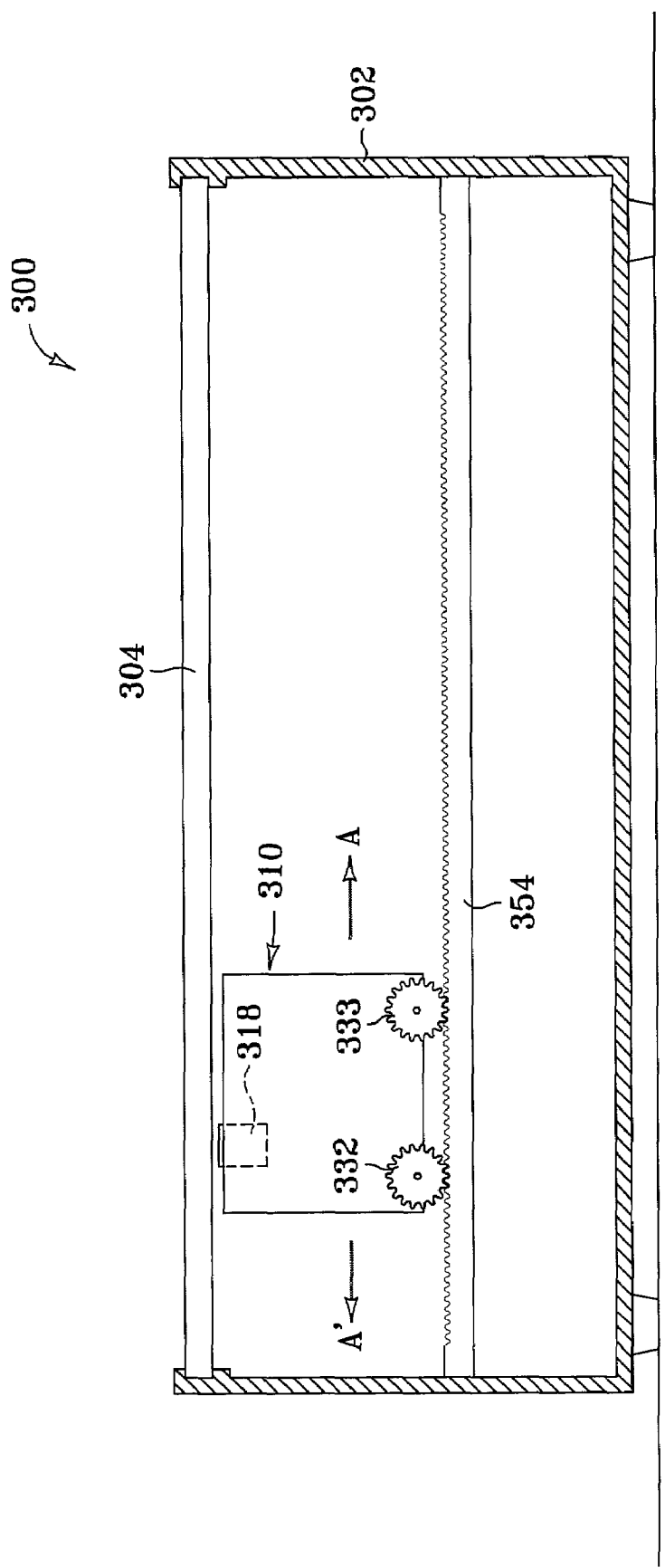
FIG. 9 is a side elevation sectional view depicting a scanning apparatus in accordance with a second embodiment of the present invention.

Turning now to FIG. 9, a second embodiment of a scanning apparatus in accordance with the present invention is shown. FIG. 9 depicts a side elevation sectional view of an optical scanning apparatus 300 that includes a scanner body 302 (which can be similar to the scanner body 102 of FIG. 2). The scanner 300 of FIG. 9 includes a light bar assembly 310, which includes a light source module 318 (similar to the light source module 118 of FIG. 2). The light bar assembly 310 can be connected to a stationary processor and power source (not shown, but similar to item 124 of FIG. 2) via a connector and a flexible cable (also not shown, but which can be, respectively, similar to connector 120 and cable 122 of FIG. 2). In the embodiment depicted in FIG. 9, the light bar assembly 310 includes drive wheels 132 and 133 which are supported on the assembly 310 towards the lower portion of the assembly 310. Drive wheels 332 and 333 rest on a drive surface 354, depicted here as a gear drive track. The drive surface (drive track 354) is supported within the scanner body 302. Thus, unlike the scanner 100 of FIG. 2 wherein the drive wheels 132 contacted a drive surface which is located above the drive wheels, in FIG. 9 the drive wheels (332, 333) contact a drive surface which is located beneath the drive wheels.

In one variation of the second embodiment of the invention, the light bar assembly 310 rests on the drive surface 354 (as shown in FIG. 9) so that only the weight of the light bar assembly is used to apply a contact force between the drive wheels 332 and 333 and the drive surface 354. In a second variation, a biasing member can be used to urge the drive wheels 332 and 333 towards the drive surface. This second variation is essentially equivalent to inverting the light bar assembly 110 of FIG. 2.

While the light bar assembly 310 of FIG. 9 is described as having drive wheels 332 and 333, it is not necessary that both wheels 332 and 333 be driven wheels. That is, one or the other of wheels 332 or 333 can be driven, while the other wheel merely acts as an idler wheel. Further, both wheels 332 and 333 can be driven in the same direction at the same time. Alternately, drive wheel 333 can be used to pull the light bar assembly 310 in direction "A" during the scanning process. (Alternately, drive wheel 332 can be used to push the light bar assembly 310 in direction "A".) After the scanning process is complete, drive wheel 332 can be used to pull the light bar assembly 310 back to its initial position in direction "A'". (Alternately, drive wheel 333 can be used to push the light bar assembly 310 in direction "A'".) In this latter arrangement a single drive motor and a pivotable pinion gear can be used to selectively drive one or the other of the drive wheels 332 or 333. Alternately, rather than use a single motor to drive both drive wheels 332 and 333, each drive wheel can be provided with a dedicated drive motor. In this way, a first drive motor can be used to drive wheel 332, and a second drive motor can be used to drive wheel 333. The first drive motor can be a precision motor, coupled to the drive wheel 332 via precision gearing, to facilitate smooth movement of the light bar assembly 310 during the scanning process. The second drive motor, and associated gearing, do not need to be precision manufactured, since retracting the light bar assembly 310 following the scanning process typically does not require precisely controlled movement of the light bar assembly. Further, the gearing between the second drive motor and the second drive wheel 333 can have a lower reduction ratio than the gearing between the first drive motor and the first drive wheel 332. This allows the scanning process to be performed at a first speed, and thereafter for the light bar assembly to be retracted (in direction "A'") at a second, higher speed.

Turning now to FIG. 7, a third embodiment of the present invention is shown. FIG. 7 depicts a side elevation, sectional view of an optical scanning apparatus 200 having a scanner body 202 (which can be similar to the scanner body 102 of FIG. 2) and a platen 204 (which can be similar to the platen 104 of FIG. 2). The scanner 200 of FIG. 7 includes a light bar assembly 210, which includes a light source module 218 that can be similar to the light source module 118 of FIG. 2. The light bar assembly 210 of FIG. 7 is in electrical power and signal communication with a stationary processor and power source 224 (similar to item 124 of FIG. 2) via a connector and a flexible cable 222 (similar to flexible cable 122 of FIG. 2). The primary difference between the scanner 200 and the scanners 100 (FIG. 2) and 300 (FIG. 9) is that scanners 100 and 300 use as a motive source a rotary electric motor (e.g., motor 142 of FIG. 2), whereas scanner 200 of FIG. 7 uses as a motive source a linear electric motor that is configured to propel the light bar assembly 210 with respect to the scanner body 202. A linear electric motor is frequently described as an "unrolled" rotary electric motor, with one component (a magnet-track portion) acting as the stator, and another component (a slider-portion) acting as the rotor (although these roles can be reversed). As will be described more fully below, one component of the linear electric motor is supported on the scanner body, while the other component is supported on the light bar assembly. Accordingly, since the light bar assembly includes a necessary component of the linear motor (i.e., the motive source of the light bar assembly), the light bar assembly of the scanner 200 of FIG. 7 can be considered as "self propelled".

More specifically, the scanner 200 includes at least one magnet-track portion 254. The magnet-track portion 254 is supported within the scanner body 202, and can be considered the equivalent of the drive surface described above with respect to scanner 100 of FIG. 2 (e.g., drive tracks 254, FIG. 4, and 354A, FIG. 5). The light bar assembly 210 of scanner 200 includes a slider portion 232 which is fixedly supported on one side of the light bar assembly 210. The slider-portion 232 is also slidably supported with respect to the magnet-track portion 254. The slider portion 232 can be considered the equivalent of the drive wheel 132 of FIG. 2. Together, the magnet-track portion 254 and the slider portion 232 form a linear electric motor. The magnet-track portion can comprise a series of permanent magnets, or a series of electromagnets that can be selectively actuated by the controller 224. When the magnet-track portion 254 comprises permanent magnets, then the slider portion 232 comprise a series of electromagnets that can be selectively actuated by the controller 224. When the magnet-track portion 254 comprises electromagnets, then the slider-portion 232 can comprise either permanent magnets, or electromagnets. That is, at least one of the magnet-track portion 254 or the slider-portion 232 comprises selectively actuatable electromagnets that allow the slider-portion 232 to be moved relative to the magnet-track portion 254 by selectively actuating the electromagnets. In this way, movement of the slider portion 232, and thus the light bar assembly 210, relative to the magnet-track portion 254 (and thus the scanner body 202) can be carefully controlled. The use of a linear motor as the motive source for the light bar assembly 210 allows precision positioning and precise speed control of the movement of the light bar assembly.

Figure 8:
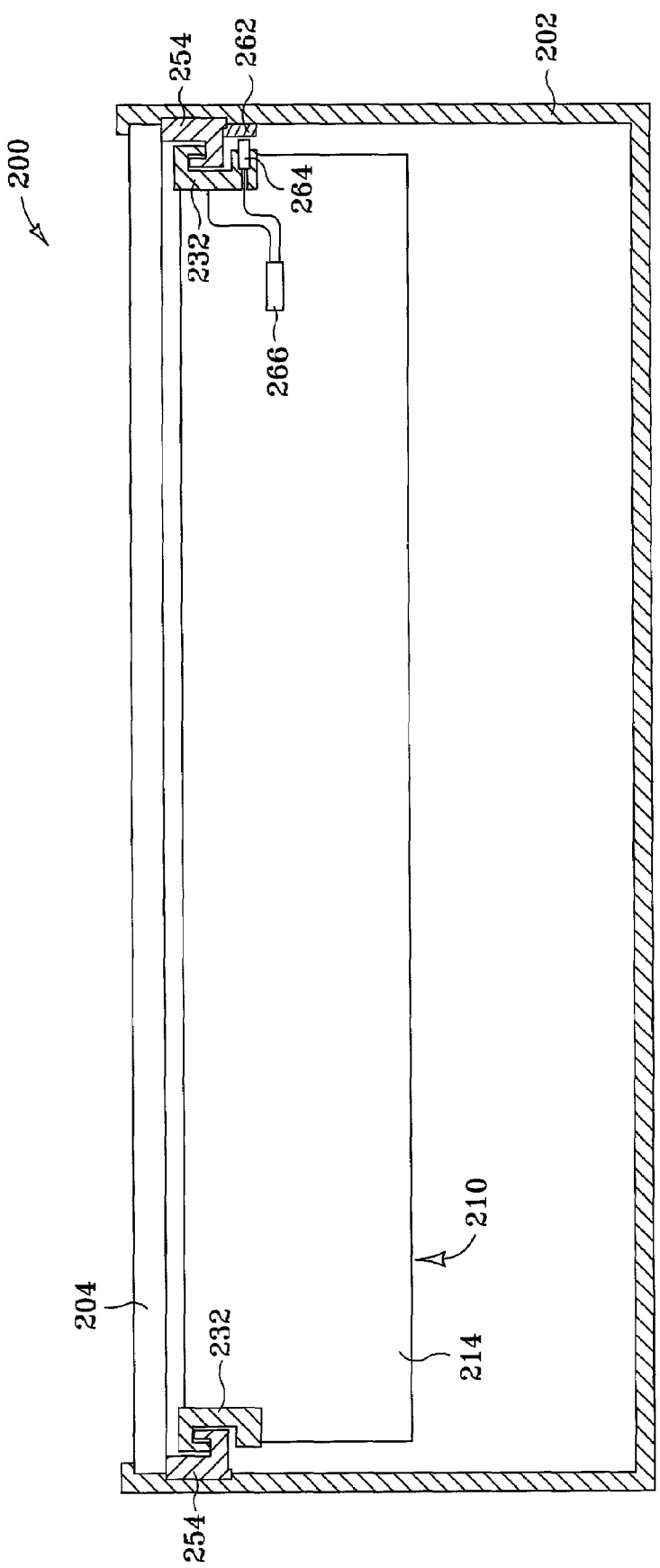
FIG. 8 is a side, sectional view of the scanning apparatus depicted in FIG. 7.

Turning to FIG. 8, the optical scanning apparatus 200 of FIG. 8 is depicted in a front elevation, sectional view. As can be seen, in the example depicted the slider-portion 232 is fixed to the side of the light bar assembly 210, and the light bar assembly is thus suspended from the magnet-track portion 254. In one variation, the slider-portion 232 can be connected to the bottom of the light bar assembly 210, and the magnet track portion 254 can be located beneath the slider-portion 232. Also, as depicted in FIG. 8, the slider-portion 232 and the magnet-track portion are shown in direct contact with one another. In another variation on the embodiment depicted in FIG. 8, a bearing, such as a ball bearing (or a plurality of ball bearings) can be placed between the slider-portion 232 and the magnet-track portion 254 to reduce friction there between. In yet another variation, the weight of the light bar assembly 310 can be bourn by a support surface, rather than by the magnet-track portion 254. For example, a configuration similar to FIG. 2 can be employed (wherein the light bar assembly 110 is supported by support wheels 212 on support surface 150). Further, the light bar assembly 210 can be magnetically levitated within the scanner body 202 to prevent the slider-portion 232 from coming into direct contact with the magnetic-track portion 254. In yet another variation, the slider-portion 232 and the magnetic track portion 254 can be placed in proximity in side-by-side parallel relationship, and the light bar assembly can be supported by a support surface in a manner similar to that described above.

As depicted in FIG. 8, the light bar assembly 210 can be defined by a first end (left side) and a second end (right side), and the scanner body can support a first magnet-track portion 254 (left side) and a second magnet-track portion (right side, also 254). The light bar assembly 210 then includes a first slider-portion 232 proximate the left side, and a second slider-portion (also 232) proximate the right side. The first and second slider-portions 232 are positioned respective to the first and second magnet-track portions 254 so that the light bar assembly 210 can thusly be driven by two linear motors. This can provide enhanced stability and accuracy of motion of the light bar assembly 210 as it is moved within the scanner body 202.

The scanning apparatus 100, 200 and 300 variously depicted above can also each be provided with a position detecting system to allow the detection of the position of the light bar assembly (110, 210 and 310) with respect to the scanner body (respectively, 102, 202 and 302). One example of a position detecting system is depicted in FIGS. 7 and 8 relative to the optical scanning apparatus 200 of the third embodiment of the present invention. Turning to FIG. 7, a linear encoding strip 262 is supported within the scanner body 202, and is mounted parallel to the magnetic track-portion 254. Turning to FIG. 8, the encoding strip 262 is seen in an end view. In this view, it can be seen that the light bar assembly 210 includes a sensor 264 which is supported by the light bar assembly and positioned so as to be capable of detected the linear encoding strip 262. Signals from the sensor 264 can be communicated to the processor (224, FIG. 7) so that the processor can determine the position of the light bar assembly relative to the encoder strip 262 (and thus the scanner body 202 and the platen 204) at any given time.

Other forms of position detecting systems can also be employed with scanning apparatus in accordance with the present invention. For example, with respect to FIG. 2, drive wheel 132, or support wheels 112, can be provided with rotary encoders. This allows a processor (e.g., 124, FIG. 2) to determine the distance traveled by the light bar assembly 110 relative to a known starting position. However, since it is more useful to know the position of the light bar assembly relative to the platen than it is to know the distance traveled by the light bar assembly, a linear encoder (such as depicted in FIGS. 7 and 8) is preferable to a rotary encoder. That is, assuming that the platen and the liner encoder strip have similar thermal coefficients of expansion, a linear encoder will generally take into account changes in the length of the platen due to thermal expansion and contraction.

In addition to the examples of position detectors just described, a rotary stepper motor (described above with respect to FIG. 2) and a rotary encoder (descried above) used in conjunction with a rotary electric motor (142, FIG. 2) can also be used as position detectors.

A fourth embodiment of the present invention provides for a self-propelled light bar assembly (such as light bar assembly 110 of FIG. 2, 210 of FIG. 7, or 310 of FIG. 9) that is configured to be used in an optical scanning apparatus (such as respective apparatus 100 (FIG. 2), 200 (FIG. 7) or 300 (FIG. 9)). The light bar assembly can include a rotary electrical motor (such as motor 142 of FIGS. 2 and 6) that is supported within the light bar assembly (110, FIGS. 2 and 6) and is configured to engage a drive surface (such as drive surfaces 154 of FIG. 4, 154A of FIG. 5, or the underside of the platen 104 of FIG. 2) within the optical scanning apparatus. The light bar assembly can alternately include a slider-portion (e.g., slider-portion 232, FIGS. 7 and 8) of a linear electrical motor that is fixedly supported by the light bar assembly (in this example, 210 of FIGS. 7 and 8). The slider-portion is then configured to cooperatively engage a static portion (e.g., magnet-track portion 254 of FIGS. 7 and 8) of a linear motor that is fixedly supported within the optical scanning apparatus.

A fifth embodiment of the present invention provides for a method of moving a light bar assembly (such as 110 of FIG. 2, 210 of FIG. 7, or 310 of FIG. 9) within a scanner body (respectively, 102, 202 or 302) of an optical scanning apparatus (respectively, 100, 200 or 300). The method includes providing a stationary track within the scanner body. Examples of a stationary track include tracks 154 of FIG. 4, 154A of FIG. 5, 254 of FIG. 7, and 354 of FIG. 9). The method further includes providing a motive source supported by the light bar assembly. Examples of a motive source include the motor 142 of FIGS. 2 and 6, and slide-portion 232 of FIGS. 7 and 8. The method then includes moving the light bar assembly along the stationary track (and thus the scanner body and a scannable object) using the motive source. In this way, the light bar assembly is "self-propelled".

When the light bar assembly is moved to a plurality of positions along the stationary track, the method can further include determining the position of the light bar assembly as it is moved along the stationary track. This can be accomplished using a position detecting system, such as the linear encoder (encoder strip 262 and sensor 264, FIG. 8) described above. The method can further include urging the light bar assembly against the stationary track while moving the light bar assembly along the stationary track. This can be accomplished, for example, by using the biasing members 116 of FIG. 2, which generate a reactive force (an "urging" force) in direction "E" as a result of pushing support wheels 112 against support surface 150 in direction "D".

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An optical scanning apparatus comprising:
   a scanner body;
   a light bar assembly supported within the scanner body, the light bar assembly comprising a drive motor, a drive wheel and a light source, the light bar assembly configured to move the drive motor and the light source together; and
   wherein the scanner body defines an inside upper surface, and wherein the drive wheel contacts the inside upper surface of the scanner body.

2. The optical scanning apparatus of claim 1, and further comprising a support surface within the scanner body, upon which the light bar assembly is supported, and wherein the light bar assembly further comprises support wheels which rest on the support surface.

3. The optical scanning apparatus of claim 2, and wherein the light bar assembly further comprises biasing members which support the support wheels on the light bar assembly, and wherein the biasing members urge the support wheels against the support surface, and thereby urge the drive wheel against the drive surface.

4. The optical scanning apparatus of claim 1, and further comprising a position detecting system to allow the detection of the position of the light bar assembly with respect to the scanner body.

5. An optical scanning apparatus comprising:
   a scanner body;
   a magnet-track portion of a linear electric motor fixedly supported within the scanner body;
   a light bar assembly comprising a slider portion of a linear electric motor; and
   wherein the light bar assembly is supported in the scanner body to place the magnet-track portion in proximity to the slider portion to thereby allow the light bar assembly to be driven along the magnet-track portion.

6. The optical scanning apparatus of claim 5, and wherein the light bar assembly is suspended from the magnet-track portion.

7. The optical scanning apparatus of claim 5, and wherein the light bar assembly rests on top of the magnet-track portion.

8. The optical scanning apparatus of claim 5, and wherein the light bar assembly rests on a support surface defined within the scanner body such that the slider-portion and the magnetic-track portions are not in direct contact with one another.

9. The optical scanning apparatus of claim 5, and further comprising a position detecting system to allow the detection of the position of the light bar assembly with respect to the scanner body.

10. The optical scanning apparatus of claim 9, and wherein the position detecting system comprises:
    a linear encoding strip supported within the scanner body and mounted parallel to the magnet-track portion; and
    a sensor supported by the light bar assembly and configured to detected the linear encoding strip.

11. The optical scanning apparatus of claim 5, and wherein:
    the light bar assembly is defined by a first end and a second end;
    the magnet-track portion is a first magnet-track portion, the slider portion is a first slider portion, and the slider portion is supported proximate the first end of the light bar assembly;
    the optical scanning apparatus further comprising:
    a second magnet-track portion supported within the scanner body; and
    a second slider portion supported proximate the second end of the light bar assembly and in contact with the second magnet track portion.

12. An optical scanning apparatus comprising:
    a scanner body;
    a self-propelled light bar assembly supported within the scanner body, the self-propelled light bar assembly comprising a drive wheel;
    a platen supported by the scanner body;
    a drive track defined on the platen; and
    wherein the drive wheel is in contact with the drive track to allow the drive wheel to drive the light bar assembly along the platen.

13. An optical scanning apparatus comprising:
    a scanner body;
    a self-propelled light bar assembly supported within the scanner body, the self-propelled light bar assembly comprising a drive wheel;
    a platen supported by the scanner body, the platen defining a first edge;
    a drive track supported within the scanner body and positioned adjacent to the first edge of the platen; and
    wherein the drive wheel is in contact with the drive track to allow the drive wheel to propel the light bar assembly with respect to the scanner body.

14. An optical scanning apparatus comprising:
    a scanner body;
    a self-propelled light bar assembly supported within the scanner body, the self-propelled light bar assembly comprising a drive wheel;
    a drive track supported within the scanner body, the, and wherein:
    the drive wheel is in contact with the drive track to allow the drive wheel to propel the light bar assembly with respect to the scanner body; and
    the drive wheel includes a rubberized outer portion, and the drive track has a non-smooth surface to allow the rubberized outer portion of the drive wheel to engage the drive track.

* * * * *